United States Patent Office 3,222,307
Patented Dec. 7, 1965

3,222,307
ALKYD RESINS PREPARED FROM COMPLEX CARBOXYLIC ACIDS DERIVED FROM MINERAL LUBRICATING OILS
Walter E. Kramer, Niles, and Louis A. Joo, Crystal Lake, Ill., assignors, by mesne assignments, to Union Oil Company of California, Los Angeles, Calif., a corporation of California
No Drawing. Filed Dec. 30, 1960, Ser. No. 79,498
12 Claims. (Cl. 260—22)

This invention relates to alkyd resins prepared from complex high-molecular-weight, polynuclear, aromatic, alkyl-aromatic petroleum fractions, which resins are characterized by their superior adhesive properties, flexibility and heat resistance. More particularly, this invention relates to alkyd resins prepared from di- and polybasic acids derived from solvent extracts wherein the extracts are used as a source of complex high-molecular-weight, polynuclear, aromatic, alkylaromatic, condensed-ring heterocyclic nuclei for said acids, through metalation and carbonation reactions and the resulting acids are transformed into alkyd resins by reaction with a stoichiometric deficiency of a dihydric alcohol or polyol to form a chain polymer and reacting the chain polymer with a polyhydric alcohol in the presence of a modifying amount of a fatty acid. This application is an improvement of the processes described in copending applications, Serial No. 55,123, filed September 12, 1960, now U.S. Patent No. 3,129,192 and Serial No. 79,541, filed December 30, 1960, now U.S. Patent No. 3,154,507.

The alkyd resins depresent a large group of compounds defined as polyesters of polyhydric alcohols and polycarboxylic acids or anhydrides, e.g., glycerol phthalic anhydride resins. According to "The Technology of Plastics and Resins," P. Mason, Jr. (1957), the alkyd resins (glyptals) are usually prepared by an esterification reaction as illustrated by the following general equation:

$$xHOOC\ (CH_2)_mCOOH + yHO\ (CH_2)_nOH \rightarrow$$
$$-OOC(CH_2)_mCOO(CH_2)_nOOC(CH_2)_m$$
$$COO(CH_2)_nOOC(CH_2)_mCOO-+H_2O$$

Because both reactants are polyfunctional, the reaction illustrates the growth of a linear polymer by such interaction of functional groups. The nature of the terminal groups in the chain is controlled by the relative number of moles of polybasic acid and polyhydric alcohol used for the reaction. When the acid is in excess, the majority of the terminal groups will be carboxyl, and if the alcohol is in excess, the majority of the terminal groups will be hydroxyl. Using a dicarboxylic acid and a dihydroxy alcohol produces a linear, thermoplastic resin. It is known in this art that resins of the type of cyclic lactides or lactones are formed through cyclization reactions and resins of the cross-linked or net-polymer type are formed, the latter being of greater importance in the field of industrial plastics. The latter type of resins are formed when a component, acid or alcohol, is chosen which is tri-functional. Cross-linking is said to take place in two stages; in the first stage, normal chain growth proceeds by the mechanism of the foregoing reaction, that is through α-esterification, and when about one-third of the free acid remains, or when the rate of linear esterification decreases, β-esterification begins resulting in a rapid decrease of the acid content and the production of a resin in gelled or insoluble state. This β-esterification is noted by the remarkable increases in molecular weight and decreases in solubility and fusibility of the product.

This invention is based on the discovery that by first forming a linear polymer of di-acid polybasic complex, high-molecular-weight acids, derived from solvent extracts obtained in the solvent refining of mineral lubricating oils and fractions thereof using a stoichiometric deficiency of a di-hydric alcohol or polyol so as to leave unreacted carboxyl groups thereon, the subsequent reaction with polyhydric organic compounds to form alkyd resins yields products of superior toughness, flexibility, adhesive properties and high heat resistance as compared with products prepared using stoichiometric ratios of reactants. A feature of this invention is the discovery that the reaction of polybasic acids derived from solvent extracts with dihydric alcohols or polyols under conditions to form a linear polymer with free carboxyl groups followed by reaction with a polyhydric alcohol in the presence of a fatty acid such as linoleic acid, or dehydrated castor oil, and glycerine forms a superior alkyd resin which may be represented by the formula:

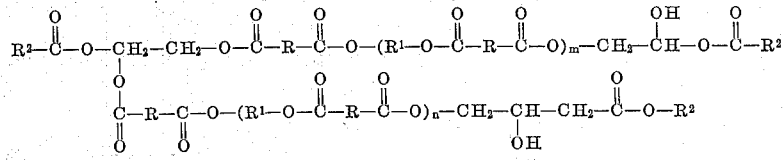

where R represents the complex, high-molecular-weight polynuclear, aromatic, alkaromatic, heterocyclic nuclei derived from solvent extracts obtained in the manufacture of mineral lubricating oils, $R^1$ represents the hydrocarbon portion of a dihydric alcohol or polyol, $R^2$ represents the hydrocarbon portion of a fatty acid, and $m$ and $n$ are whole numbers, being the same or different and ranging from 1 to 10.

It becomes then a primary object of this invention to provide a new class of alkyd resins.

An object of this invention is to provide a new class of alkyd resins derived from dibasic and polybasic acids prepared from solvent extracts, obtained in the refining of mineral lubricating oils.

An object of this invention is to provide a new class of alkyd resins prepared by the reaction of dihydric alcohols or polyols and dibasic and polybasic acids prepared from solvent extracts obtained in the refining of mineral lubricating oils under conditions to form a linear polymer with free carboxyl groups forms a useful intermediate product from which highly useful alkyd resins can be prepared.

Another object of this invention is to provide a new class of alkyd resins and a method of preparation by the sequential reaction of dihydric alcohols and polyols with dibasic and polybasic acids and subsequently with polyhydric alcohols with or without a fatty acid modifier, said polybasic acids being derived from solvent extracts obtained in the solvent refining of mineral lubricating oils and fractions thereof.

Still another object of this invention is to provide a new class of alkyd resins prepared by the sequential reaction of dihydric alcohols or polyols with dibasic and polybasic acid mixtures derived from the high-molecular-weight, complex, polynuclear, aromatic, alkylaromatic and/or heterocyclic compounds present in solvent extracts, to form a linear polymer terminating in carboxyl groups and further reacting the linear polymer to form an alkyd resin.

These and other objects of this invention will become apparent or be described as the specification proceeds.

The complex, polynuclear, high-molecular-weight alkylaryl, aryl, or heterocyclic polybasic acids used to prepare the modified resins of this invention are described in copending application Serial Number 819,932, filed June 12, 1959, now U.S. Patent No. 3,128,302, and S.N. 79,661, filed December 30, 1960, now U.S. Patent No. 3,153,087. Although the polybasic acids may be prepared by the various known methods in the prior art for converting aromatic materials to carboxylic acids, such as are described in said copending applications, using solvent extracts as starting materials the technique set forth in said later application represents a preferred method of preparation because of the increased efficiency of the process and the higher yields of polybasic acids of high purity that are obtained. The starting materials for the reaction are well known by-products of the solvent extraction of mineral lubricating oils and are adequately described as those aromatic materials separated from mineral lubricating oils and their fractions, i.e., those aromatics obtained in the manufacture and refining of neutral oils and bright stocks during treatment with a selective solvent designed to extract the predominantly aromatic materials from the paraffinic materials. Solvent extracts resulting from the treatment of mineral lubricating oils for the purpose of separating non-aromatic hydrocarbons (the raffinate and finished oil) from the aromatic hydrocarbons (the extract and waste product) may be used and are preferred as starting materials.

Since the general process of refining mineral lubricating oils in which solvent extracts are obtained is well known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent, and may be black in color. The deasphalted oil may have an API gravity of 21.5° to 21.8°, viscosity SUS 210° F. of 165–175, NPA color 6–7, flash 575° F., fire 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as blending stock, for lubricating oils, and the solvent extract, predominating in complex aromatic constituents, is distinctively useful in accordance with this invention.

For example, a crude oil from an East Texas field with an API gravity of 33.1 was topped to remove such light fractions as gasoline, naphtha, kerosine, and a light lubricating distillate. The vacuum residue was a reduced crude having a viscosity of 1251 SUS at 210° F., 2.2 percent sulfur, and an API gravity of 12.6. After propane-deasphalting, the oil had a viscosity of 174 SUS at 210° F., and an API gravity of 21.7. This deasphalted oil was treated with phenol to produce a raffinate from which an aviation lubricating oil could be prepared. The oil extracted by phenol treatment, after removal of phenol, is ready for use as the starting material in accordance with this invention.

Solvents other than phenol may be used to obtain the extraction product used in accordance with this invention, for example, liquid sulfur dioxide, nitrobenzene, chlorex, chlorophenol, trichloroethylene, cresylic acid, pyridine, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

TABLE I.—SOURCES AND PHYSICAL CHARACTERISTICS OF SOLVENT EXTRACTS

| Ext. No. | Crude source | Solvent | API grav. | Sp. gr. @ 10° F. | Vis/ 100° F. | Vis/ 130° F. | Vis/ 210° F. | V.I. | Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Sante Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitrobenzene | 10.0 | 1.000 | | | 1,500 | | +75 | 555 | 640 | 60 | | |
| 13 | Mid-Cont | Propanecresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis neutral, had an average molecular weight of 300, and contained 76.8% aromatics (by the silica gel procedure).

Extract No. 42 was obtained in the production of 150 Vis Bright Stock, had an average molecular weight of 590, and contained 86% aromatics, 14% saturates, 86.2% carbon, 11.4% hydrogen, and averaged 3.3 aromatic rings per aromatic molecule.

Extract No. 43 was obtained in the production of 170 Vis neutral, had an average molecular weight of 340; contained 84.1% aromatics, 15.9% saturates, 86.4% carbon, 10.7% hydrogen and averaged 2.7 aromatic rings per aromatic molecule.

Extract No. 44 was obtained in the production of 200 Vis neutral, had an average molecular weight of 340, contained 87% aromatics, and 13% saturates.

Extract No. 45 was obtained in the production of 160 Vis Bright Stock, and contained 92% aromatics and 8% saturates.

The solvent extracts from lubricating oils used as starting materials for this invention have the following general properties and characteristics:

TABLE II

| Characteristic: | Range of value |
|---|---|
| Gravity, ° API | 8.0–15.0 |
| Gravity, sp., 380/15.5° C. | 0.9550–1,000 |
| Viscosity SUS @ 100° F. | [1] 350–25,000 |
| Viscosity SUS @ 130° F. | 140–19,0000 |
| Viscosity SUS @ 210° F. | 200–1500 |
| Viscosity index | −101–+39 |
| Pour point (max.) | +35–100 |
| Color, NPA | +2–5D |
| Molecular weight, average | 320–750 |
| Boiling point (initial) ° F. | 300–1000 |
| Boiling point (end) ° F. | 400–1200 |
| Sulfur, percent wt. | 2.0–4.5 |
| Sulfur compounds percent wt. | 20–50 |
| Aromatics and thio compounds | 50–90 |
| Thio compounds | 14–40 |
| Neutral aromatic hydrocarbons | 40–51 |
| Av. no. of aromatic rings/mean arom. mol. | 1.7–3.5 |
| H/C wt. ratio | 0.116–0.136 |
| H/C atom ratio, whole sample | 1.383–1.622 |
| H/C atom ratio, aromatic portion | 1.289–1.500 |
| Nearest empirical formula | $C_{22}H_{30}-C_{44}H_{66}$ |

[1] Ext.

The gravities of the extracts in general increase with increase in the viscosity of the raffinate at a constant viscosity index. Stated otherwise, the gravities of these extracts increase with decrease in viscosity index of the raffinate at constant viscosity. For the production of 100±5 VI neutral oils, the viscosities of the extracts increase with increase in stated viscosities of the neutral oils (raffinates). The pour points of extracts are high and are affected by changes in the depth of extraction. The solvent extracts are characterized by containing aromatic and sulfur compounds in the range of 70–90%, the remainder being principally saturates, or material behaving as saturates, together with a minor proportion of from 3.0 to 6.0% of organic acids. The organic acids present are not susceptible to extraction by the use of aqueous strong caustic because of emulsion formation. Very little asphaltic material is present in solvent extracts and they contain no materials volatile at room temperature.

The materials shown in Tables I and II are merely illustrative and the invention is not to be limited thereby.

It is apparent that the composition and characteristics of the acids, or resins prepared therefrom, will vary somewhat depending on the concentration and types of polynuclear aromatic hydrocarbons in the solvent extracts used. In such complicated mixtures as solvent extracts from petroleum oils, and solvent extracts from lubricating oil fractions, the content of aromatic materials may vary from about 20% to 100% by weight.

It is to be understood, accordingly, that the invention is broadly applicable to any petroleum fraction which contains at least about 20% by weight of reactable polynuclear aromatic hydrocarbons as herein defined. These types of complex aromatic hydrocarbons are found in high concentrations in solvent extracts obtained in the manufacture of neutrals and bright stocks, all of which materials are to be understood as suitable starting materials.

It is to be understood that the invention is particularly applicable to any solvent extract from the refining of mineral lubricating oils for the purpose of separating nonaromatic and aromatic hydrocarbons, that is, where the solvent exerts a preferential selectivity for the nonparaffinic constituents. The extracts are substantially freed of a solvent, e.g., phenol extracts are dephenolized by steam stripping, so that they contain practically no solvent.

In preparing the polybasic acids to be used in accordance with this invention, the starting solvent extract material is reacted first with an alkali metal in elementary form. For this purpose sodium, lithium, potassium, rubidium and cesium, and mixtures and alloys of these, may be used, that is, members of Group IA of the Periodic Chart of the Atoms, Hubbard, 1941, Revised Chart. About 30 parts of solvent extract are used per 1 to 5 parts of alkali metal. The reaction may be carried out at temperatures as low as −60° C. (−76° F.) and as high as 80° C. (176° F.). The prior art solvents for this type of reaction such as dimethyl glycol ether, dimethyl ether, methyl alkyl ethers, dialkyl glycol ethers, tetrahydrofuran, and trimethylamine may be used.

The reaction of the alkali metal with the reactive complex aromatic components does not occur unless steps are taken as shown in said copending application to overcome the effects of certain reactive impurities in the complex mixture which normally coat the sodium surface and prevent reaction. The undesirable reactive impurities present in the solvent extracts may include traces of water, organic acids, mercaptens and other sulfur compounds, phenol, and other nitrogens or oxygen containing compounds. The reaction can be advantageously effected if fresh sodium surfaces are continuously exposed until all undesired reactive impurities have reacted, or if sufficient sodium surface to react with all such impurities plus a moderate excess is used. Another expedient is to use a large excess of sodium metal. It appears that once the undesired reactive impurities have reacted, the desired reaction can take place on the excess clean sodium surface. It also appears that once the complexing reaction occurs, the oil solution of complex begins to dissolve the undesired reaction product coating from the sodium surface, in effect cleaning the particle surface and rendering more surface available for reaction.

The reaction is difficult to start unless an excess of sodium and fresh sodium surface is used. Certain expedients have been found advantageous. Among these are continuous shearing of the sodium particles until the reaction starts. This has been accomplished with a Brookfield counter-rotating stirrer. Other shearing or crushing devices, such as a Waring Blendor, colloid mills, mullers, ball mills, and the like, also may be used. Even with continuous shearing or crushing, many minutes and sometimes hours are required before the desired complexing reaction starts. The length of time required depends on the relative amounts of undesired impurities present, and the sodium surface made available. The inhibiting or demonating effect of the undesirable reactive impurities is one reason why petroleum hydrocarbon sources were not exploited as starting materials for this type of reaction.

Another expedient found advantageous resides in the use of preformed sodium dispersion in an inert liquid. Such dispersions and their preparation are well known in the art. According to said application Serial No. 819,932, a large excess of dispersed sodium must be used to initiate the reaction, unless steps are taken to remove the coating of undesired reaction products from the sodium surface. Such steps include the use of mills.

Still another expedient, and the preferred one, is the actual preparation of a sodium dispersion in the solvent extract to be reacted. The undesirable impurities appear to completely react with the sodium during preparation of the dispersion, and as a consequence, clean sodium surface is available for the desired reaction as soon as the "active ether" is mixed with the sodium-reactive-component mixture. The desired reaction then is practically instantaneous and proceeds smoothly and rapidly to completion with only a slight excess of sodium.

When the reaction with alkali metal is complete, as evidenced by its dissolution, the reaction mixture is treated with carbon dioxide, either at about the same or a different temperature as was used during the reaction with alkali metal. The reaction mixture is next washed with water and allowed to separate into an oil phase and a water phase. Several applications of 1 volume of water per 5 volumes of reaction mixture may be used and the water layers collected. Counter-current water-washing may be used. The resulting water phase is acidified with an acid such as a hydrohalic sulfuric acid, or phosphoric acid. This causes the polybasic, polynuclear aromatic acids to separate or precipitate from the aqueous mixture.

EXAMPLE I

A mixture of polybasic acids from aromatic extract oil, derived from a petroleum lube oil stock by phenol extraction in the preparation of 170 vis., 100 V.I. neutral oil, was prepared by the following procedure. A solution of 100 g. of aromatic oil in 675 cc. of dry tetrahydrofuran was placed in a 2100-cc. flask equipped with a Brookfield counter-rotating stirrer and gas-inlet and -outlet. The solution was cooled and maintained at 10–30° C. (50–86° F.) while 8.3 g. of metallic sodium in the form of $3/16''$ cubes were added, after which cooling was maintained during a two-hour reaction period. No complex formation appeared to occur until approximately 25 minutes had elapsed. Thereafter, a strong color change was noted and the reaction appeared to proceed relatively rapidly.

After stirring for two hours, the mixture was cooled to −60° C. (−76° F.) while an excess of carbon dioxide gas was introduced. The color was discharged by reaction with carbon dioxide, but no precipitation was noted. The unreacted sodium (5.1 g.) was removed, the tetrahydrofuran was stripped from the reaction mixture by applying a vacuum, after which the remaining liquid was combined with ether and washed with water.

The resulting aqueous phase was acidified and washed with ether to recover the free acids and other reaction products. About 90% w. of the original oil feed stock was recovered, and about 11% has reacted to form the acidic product to be used in accordance with this invention. The product had an indicated average molecular weight of 686 and a saponification value of 171. The calculated equivalent weight was 328 indicating 2.1 acid groups per molecule. However, the true average molecular weight probably was somewhat lower than 686, the indicated average molecular weight being higher than actual because of molecular association in the benzene solvent during its determination. Extract No. 18 of Table I was used in this example.

EXAMPLE II 100 gms. of solvent extract and 675 ml. of dry tetrahydrofuran were charged to a one-liter, 3-necked flask equipped with a stirrer, thermometer, pressure-equalized drop-funnel, gas-inlet with rotometer, and gas-outlet. A dry nitrogen atmosphere was maintained. Approximately 100 gms. of Alundum balls $5/16''$ diameter were charged and agitation started. The solution was cooled to −20° C. (−4° F.) and 8.3 gms. of sodium as a 20% dispersion in toluene were added. After 5 minutes, no reaction had occurred and the solution was allowed to warm. After 25 minutes, the temperature had risen to −7° C. (19.4° F.) and a few particles of sodium appeared to be reacting, i.e., the deep color of the complex was seen to be forming on the surface of a few particles when agitation was momentarily stopped. Within an additional 17 minutes, the reaction was proceeding smoothly and the dry carbon dioxide atmosphere was introduced to the flask in excess of −18° C. (−0.4° F.) over a period of 78 minutes. The reaction mixture was worked up as in the previous example after the excess sodium was destroyed with water. Hydrogen evolution from the remaining sodium indicated that only 48% of the sodium had reacted. Approximately 84.5% of the oil was recovered, indicating 15.5% had reacted.

The acids recovered weight 22.5 gms. and had a saponification value of 241, indicating an equivalent weight of 233, and contained 2.8% sulfur. With a similar experiment, the acids recovered had a saponification value of 323, indicated 173 equivalent weight, with an indicated average molecular weight (cryoscopic) of 600. They contained 3.0% sulfur. The ratio of molecular weight to equivalent weight was 3.4, indicating a mixture containing acids with more than 2 acid groups per molecule. Extract No. 18 of Table I was used in this example.

Suitable carrier liquids to form the initial mixture of alkali metal may be any solvent which is non-reactive in relation to the alkali metal and which does not interfere with the reactions taking place. The filter press used may be of the plate-and-frame type employing kieselguhr or diatomaceous earth as the filter aid or filter means. The water used in the process should be free of reactable salts and other impurities. Ordinary water-purification precautions applicable to organic synthesis should be applied to insure against contamination of the end products from this source. The hydrocarbon solvent used may be any liquid, or liquefiable, inert, aliphatic hydrocarbon. Propane, butane, heptane, octane, etc., may be used for this purpose of removing unreacted oil from the mixture. The solvents used in stripper operations may be any ether or ketone having an appreciable solubility for the complex acids product. Included in this category are methyl ethyl ketone, diethyl ketone, acetone, methyl ether, diethyl ether, propyl ether, and dibutyl ether. Mixed ethers and ketones are also useful. The acid used may be hydrochloric, sulfuric, phosphoric, and the like; non-mineral acids such as acetic and chloroacetic may also be used.

In operating the process on a continuous basis, solvent-extract oil and alkali metal are pumped through heat exchangers to a colloid mill where the alkali metal, in this case sodium, is dispersed in the reactant extract oil. The dispersion passes through a cooling heat-exchange into a second colloid mill where it is intimately mixed with solvent (such as tetrahydrofuran). The reaction mixture then passes through cooling heat-exchangers to mixing- and carbonating-vessel where carbon dioxide is introduced by means of a manifold. The carbonated solution is pumped from reactor by means of a pump to a final carbonation zone where excess carbon dioxide is injected under pressure.

The carbonated mixture then passes to a continuous rotary filter from which unreacted sodium and other insoluble materials are removed, and the filtrate passes in heat-exchange contact with the dispersion in an exchanger by means of a suitable chamber. The effluent from the exchanger passes to the top of tower wherein solvent is removed overhead and conveyed by a pump through heat exchangers and the chamber.

The residue is conveyed to a continuous extraction tower where water and ether are introduced countercurrently. The hexane phase is stripped in another tower to recover unreacted oil as bottoms. The ether is condensed and conveyed to a second continuous extraction tower into which mineral acid (hydrochloric acid) and the alkaline extract from the continuous extraction tower are introduced countercurrently. The water (acidic) phase is discarded or treated for water recovery. The upper phase is stripped, whereby an overhead ether fraction is taken off, and the polybasic product is recovered.

The di- or polybasic polynuclear acids produced are mixtures of acids having aromatic nuclei of the naphthalene, phenanthrene and anthracene type having several alkyl groups on each aromatic nucleus and wherein the content of sulfur, nitrogen and oxygen is in the form of heterocyclic rings associated therewith. The acids are more accurately described as dihydrocarboxylic acids since there is a change in structure with the introduction of the carboxyl groups. A very simplified structure without showing the numerous alkyl substituents or the heterocyclic nuclei, and the relative percentage of each structure may be:

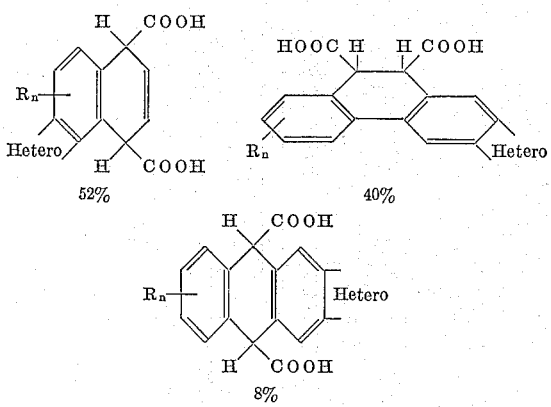

where R comprises alkyl substituents having a sum of about 15 to 22 carbon atoms in each formula, $n$ is the number of such alkyl group which may be from 3 to 10 and "hetero" illustrates one or more S, N, or O containing heterocyclic rings in the molecule. The molecular weight of the acids ranges from 300 to 600 and the average from 325–450.

The following Table III gives the physical properties of typical extract di-, or polybasic acids:

TABLE III.—PHYSICAL PROPERTIES OF EXTRACT DIBASIC ACIDS

| Property: | Value |
|---|---|
| Acid number | 200–280 |
| Melting points | [1] 80–90° C. |
| Bromine No. | 16–24 |
| Percent sulfur | 1.7–2.3 |
| Color | Deep red |
| Percent unsaponifiables | 2–6 |

[1] 176–194° F.

In order to illustrate the invention and the unusual effect of using a stoichiometric deficiency of the dihydric alcohol or dihydric phenol the following examples are given.

EXAMPLE III

A 150-g. portion of "extract dibasic acids" was charged to a resin kettle, equipped wtih mechanical stirrer and reflux condenser, the condenser being provided with a water trap, and was heated with 29 g. of diethylene glycol. As soon as the "extract dibasic acids" became molten, the stirrer was started, and the mixture was heated to 132° C. (270° F.) where it was maintained until water evolution ceased. Then the mixture was cooled to 93° C. (199° F.), 200 g. of dehydrated castor oil acids and 32 g. of glycerine were added, and the mixture was heated slowly to 232° C. (450° F.), where it was maintained until water evolution ceased.

A 70% solution of the alkyd in xylene was compared with a 70% solution of an alkyd representative of the alkyds prepared using stoichiometric amounts of reactants (150 g. "extract dibasic acids," 200 g. of dehydrated castor oil acids, and 40 g. glycerine) by coating several test panels with 1 mil films and baking them at 160° C. (320° F.) for varying lengths of time. The baked films had thicknesses of about 0.5 mil. The alkyds representing this invention were much more resistant to impact, i.e., they adhered better to the metal surface and were more flexible. The results were as follows:

*Impact resistance of alkyds*

| Resin | Baking Time at 160° C. (320° F.) | | |
|---|---|---|---|
| | 40 minutes | 80 minutes | 160 minutes |
| Alkyd resin "A" | 27 | 23 | 17 |
| Alkyd resin of this invention | 30 | 30 | 29 |

Alkyd resin "A" was prepared using stoichiometric amounts of reactants.

EXAMPLE IV

Another alkyd representing this invention was prepared by charging 150 g. of "extract dibasic acids" and 17 g. of ethylene glycol to a resin kettle and heating the mixture at reflux temperature (132° C., 270° F.) until water evolution ceased. Then the mixture was cooled to 93° C. (199° F.), 200 g. of dehydrated castor oil acids and 32 g. of glycerine were added, and the mixture was heated to, and maintained at 450° F. until water evolution ceased again. The resulting alkyd was flexible, adhered strongly to metal, and was resistant to deterioration by heat.

EXAMPLE V

A 150-g. portion of the complex polynuclear aromatic polycarboxylic acids of Example I is charged to a resin kettle equipped with a mechanical stirrer and reflux condenser as in Example III and heated with 30 g. of pinacol to a temperature of about 100° C. (212° F.) for 2 hours. Agitation is started as soon as the complex polynuclear aromatic polycarboxylic acids have melted and the mixture is maintained at 150° C. (302° F.) for the next 2 hours, until water evolution ceased. The mixture is then cooled to 85° C. (185° F.) and 200 g. of dehydrated castor oil acids and 32 g. of glycerine are added and the reaction mass is heated to 232° C. (450° F.) where it is maintained until further water evolution ceased. The resulting alkyd resin is impact resistant, has a high degree of metal adherence and is quite flexible.

The foregoing examples are merely illustrative of the invention.

The method of this invention produces cross-linked alkyd resins through the reaction of an alcohol containing at least two hydroxyl groups with a complex polycarboxylic acid of petroleum origin under conditions to promote reaction between the alcohol and a portion only of the carboxyl groups thereby forming linear polyester polymers and reacting said linear polyester polymer with the same or different di- or polyhydric alcohol in the presence of a modifying acid under conditions which promote reaction between the alcohol and modifying acid and the remaining hydroxyl groups to form a cross-linked alkyd resin. The alcohol used in the second step can be the same or a different alcohol than that used in the first step. The modifying acid can be any one or mixture of two or more of the acids other than those having the complex polynuclear nuclei derived from petroleum sources or can be the last mentioned complex acids or mixtures of the complex polynuclear acids of petroleum origin and the other acids disclosed herein. The products are polyesters in which at least two linear polyester chains containing unreacted carboxyl groups are cross-linked with or by a different di- or polyalcohol in conjunction with the modifying acid.

In carrying out the process the first stage of the reaction is conducted using a sufficient amount of the polyhydric or dihydric alcohol to provide between about 0.1 to 0.9 hydroxyl functions per carboxylic acid function in the acid. Preferably about 0.4 to 0.5 hydroxyl functions are provided for each carboxyl function of the acid. The second step of the reaction is conducted by using at least a sufficient amount of preferably a slight excess, e.g., 1% to 3% excess, of the same or different alcohol to react with the remaining carboxyl groups and completely esterify the acids and cross-link the linear polymer chains in conjunction with the modifying acid. The second stage reaction links together the linear polymer through unreacted carboxyl groups from the first reaction to create higher molecular weight polymers containing recurring units made up of the linear polymer of the first stage. Because all of the reactants used in these reactions are at least difunctional, several other possible structures may result from the two stage method by which the resins are prepared, but all of the products will be generally similar to the illustrative structures shown herein.

The alcohols used in the reactions of this invention have at least two hydrozyl groups per molecule. Examples of dihydric alcohols include the glycols i.e., ethylene glycol, propylene glycol, trimethylene glycol, alpha butylene glycol, beta butylene glyco, butane dio-1,3, butanediol-1,4, butanediol-2,3, isobutylene glycol, pinacol, sym-dipropylglycol, 2-methyl-1,2-propanediol, 1,4-pentanediol, 1,5-pentanediol, 2,3-pentanediol, 2,4-pentanediol, 2-methyl-1,4-butanediol, 2-methyl-2,3-butanediol, 2-ethyl-1,3-propanediol, 2,2-dimethyl-1,3-propanediol, 1,3-hexanediol, 1,4-hexanediol, 1,6-hexanediol, 2,5-hexanediol, 2-methyl-1,3-pentanediol, 4-methyl-1,4-pentanediol, 3-methyl-1,5-pentanediol, 2-methyl-2,4-pentanediol, 3-methyl-2,4-pentanediol, 3-methyl-2,5-pentanediol, 2-ethyl-1,3-butanediol, 2-(n-propyl) 1,3-propanediol, 2-methyl-2-ethyl-1,3-propanediol.

Others include 1,4-heptanediol, 1,7-heptanediol, 2,4-heptanediol, 3-methyl-2,4-hexanediol, 3-methyl-3,5-hexanediol, 3-ethyl-2,4-pentanediol, 2-isopropyl-1,3-butanediol, 2-isopropyl-1,3-butanediol, 2-isopropyl-1,4-butanediol, 2-(n-butyl)-1,3-propanediol, 2,2-diethyl-1,3-propanediol, 1,2-octanediol, 1,8-octanediol, 2,4-octanediol, 5-methyl-2,4-heptanediol, 2-methyl-4,6-heptanediol, 2,5-dimethyl-2,5-hexanediol, 3,4-dimethyl-3,4-hexanediol, 2,2-dimethyl-3,5-hexanediol, 2-isobutyl-1,3-butanediol, 2-methyl-2-butyl-1,3-propanediol, 1,9-nonanediol, 4-methyl-1,4-octanediol, 2-ethyl-2-butyl-1,3-propanediol, 1,10-decanediol, 1,11-undecanediol, 1,12-dodecanediol, 1,13-tridecanediol, 1,14-tetradecanediol, 1,15-pentadecanediol, 1,16-hexadecanediol, 1,17-heptadecanediol, 1,2-octadecanediol, 1,2-nonadecanediol, 1,2-eicosanediol, for those members containing up to 20 carbon atoms. Unsaturated diols such as 2-butene-1,4-diol and 2-butyne-1,4-diol are also included. Any paraffine homologues of the foregoing containing up to 20 carbon atoms. Others include pentamethylene glycol, decamethylene glycol, the polyethylene glycols of the formula,

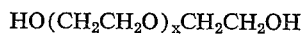

HO(CH$_2$CH$_2$O)$_x$CH$_2$CH$_2$OH where $x$ is 1 to 26 and the polypropylene glycols of similar series.

The polyhydric alcohols used are any compounds containing three or more hydroxyl groups per molecule such as glycerol, diglycerol, butanetriol-1,2,3, glyoxal, i-erythritol and optically active isomers thereof, pentaerythritol, the pentahydric alcohols (CH$_2$OH)(CHOH)$_3$ CH$_2$OH and isomers thereof, adonital, the riboses, d-arabitol, l-arabitol, xylitol, the hexahydric alcohols

(CH$_2$OH)(CHOH)$_4$ CH$_2$OH d-mannitol, d-sorbitol, d-iditol, dulcitol, the heptahydric alcohols, perseitol, volemitol, etc.

The fatty acids used in accordance with this invention as modifiers include the saturated and unsaturated fatty acids and their mixtures from such sources as:

Vegetable oils
Babassu oil
Castor oil
Coconut oil
Corn oil
Cottonseed oil
Hempseed oil
Linseed oil
Poppyseed oil
Safflower oil
Sunflower oil
Tung oil
Mustard oil
Olive oil
Oiticica oil
Palm oil
Palm kernel oil
Peanut oil
Permilla oil
Rapeseed oil
Soybean oil
Tall oil (commercial)
Walnut oil Animal fats and oils
Butter fat
Lard
Neat's-foot
Tallow (beef)
Tallow (mutton)

Marine fats and oils
Herring
Menhaden
Sardine
Sperm (body)
Sperm (head)
Whale

The foregoing are sources of such saturated fatty acids as caproic, caprylic, capric, lauric, myristic, palmitic, stearic, arachidic, behenic and lignoceric acids, that is, saturated fatty acids having from 6 to 24 carbon atoms. The unsaturated fatty acids include lauroleic, myristoleic, palmitoleic, oleic, gadoleic, erucic, ricinoleic, linoleic, linolenic, eleostearic, licanic, arachidonic and clupanodonic acids to include those having from 12 to over 26 carbon atoms per molecule. Rosin acids, conjugated acids, hydroxy acids and terpenic acids in this series are also included. The hydrogenated and dehydrated forms thereof are intended as reactants for the preparation of the resins of this invention. A preferred group of acids include dehydrated castor oil fatty acids comprising 1–2% palmitic, 1–2% stearic, 0–8.5% oleic, 86–92% ricinoleic, and 3–6% linoleic acids. A preferred species of the dehydrated castor oil fatty acids contains about 2% palmitic acid, about 1% stearic acid, about 7% oleic acid, about 87% ricinoleic acid, and about 3% linoleic acid. Dehydrated corn oil acids, dehydrated hempseed acids, and dehydrated cottonseed acids may also be used. The proprietary acids known as "Empol 1022" manufactured by the Emerg Industries and prepared in accordance with Patent No. 2,955,121 are additional examples. These acids contain approximately 71% dimer, 26% trimer and 3% monomer and have a molecular weight of about 600. The structure of the dibasic acids present in "Empol 1022" has not been definitely established but is thought to correspond to the following formula:

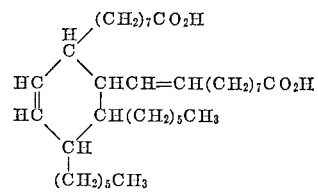

The first and second stages of the reactions of this invention are conducted using known esterification conditions with or without an esterification catalyst such as a small amount of sulfuric acid, hydrogen chloride, or arylsulfuric acid. The equilibrium is shifted to the right by removal of water, either by azeotopic distillation or by means of a suitable drying agent. In some instances the necessity for continuous drying may be eliminated by using methylene or ethylene chlorides as solvents. In carrying out the reaction at room temperature, a small amount of an acid chloride such as thionyl chloride, acetyl chloride, or stearylchloride may be used. Such other catalysts as boron trifluoride, trifluoroacetic anhydride, zinc dust and the like may be used. The reaction takes place with most di- and polyhydric alcohols at temperatures between about 70° F. to 500° F., using atmospheric or superatmospheric conditions. By collecting the water produced during the reaction, and plotting the volume thereof against time the course of the esterification can be followed. Because the conditions of esterification applicable to the reaction herein are well known, there is no necessity for further description.

The resin products of this invention are characterized by their superior adhesive properties, flexibility and heat resistance making them unique for use where such properties are desired or necessary. The products form baked films of improved resistance to impact, adherence and flexibility making them highly adaptable to use in coating compositions, paints, varnishes and as ingredients in adhesives or caulking compositions.

Other examples of feed materials that comprise a source of related polynuclear aromatic compounds from which the polynuclear acids used herein can be derived are FCC recycle stock and combined reformate polymers described in copending application, Serial No. 79,661 filed December 30, 1960.

The embodiments of the invention in which an exclusive property or privilege is claimed are defined as follows:

1. The modified polyester resin reaction product at a temperature of about 70° to 500° F. under esterification conditions of (1) a complex carboxylic acid derived from solvent extracts obtained in the solvent extraction of mineral lubricating oils using a solvent selective for aromatic compounds by metalation of said solvent extracts to form the alkali metal adduct, carbonation of said adduct to form the alkali metal salt of the corresponding carboxylic acid and acidification of said salt to form the free acid, said carboxylic acid being characterized by having complex, polynuclear, aromatic, alkyl aromatic and heterocyclic nuclei predominating in carbon and hydrogen, containing about 1.7 to 4.5% by weight of combined sulfur and also containing oxygen and nitrogen, having an average molecular weight of about 300 to 600, and having about 1.7 to 3.5 average number of aromatic rings per mean aromatic molecule,
   (2) a polyol having 2 to 54 carbon atoms to the molecule and 2 to 7 hydroxyl groups to the molecule, said polyol being present in an amount sufficient to provide about 0.1 to about 0.9 hydroxyl functions per carboxylic acid function of said complex carboxylic acid to form a linear polyester and followed by reaction of said linear polyester with
   (3) a stoichiometric excess of an added amount of said polyol said reaction with said linear polyester being with a polyol different from the polyol used in the initial formation of said linear polyester.

2. The modified polyester resin in accordance with claim 1 in which said complex carboxylic acid comprises a mixture of complex mono-, di- and polycarboxylic acids having an acid number of about 200 to 280, a melting point of about 176° F. to 194° F., contain about 1.7 to 2.3% by weight of combined sulfur and have an average molecular weight of about 325 to 450.

3. The modified polyester resin in accordance with claim 1 in which said polyol is initially present in an amount sufficient to provide between about 0.4 to 0.5 hydroxyl functions per carboxylic acid function of said complex carboxylic acid.

4. The modified polyester resin in accordance with claim 1 in which the reaction with an added amount of said polyol is conducted in the presence of additional carboxylic acid of the group consisting of a fatty acid and said complex carboxylic acid.

5. The modified polyester resin reaction product in accordance with claim 4 in which said fatty acid is an saturated fatty acid having 6 to 24 carbon atoms per molecule.

6. The modified polyester resin reaction product in accordance with claim 4 in which said fatty acid is an unsaturated fatty acid having 6 to 36 carbon atoms per molecule.

7. The modified polyester resin reaction product in accordance with claim 6 in which said fatty acid is dehydrated castor oil acids.

8. The reaction product of
   (1) complex mixed mono-, di- and polycarboxylic acids derived from phenol extracts obtained in the phenol extraction of mineral lubricating oils by reaction of said phenol extracts with sodium to form the sodium adduct, carbonation of said sodium adduct to form the sodium salt of the corresponding carboxylic acid and acidification of said salt to form the free acids, said acids being characterized by having an acid number of about 200 to 280, contain about 1.7 to 2.3% by weight of combined sulfur and having an average molecular weight of about 325 to 450,
   (2) a stoichiometric deficiency of diethylene glycol at a temperature of about 266° F. to form a linear polyester, followed by reaction of said linear polyester with
   (3) a stoichiometric excess of glycerine in the presence of
   (4) dehydrated castor oil acids at a temperature of about 450° F.

9. The reaction product in accordance with claim 8 in which about 150 parts of complex carboxylic acids, about 29 parts of diethylene glycol, about 32 parts of glycerine and about 200 parts of said dehydrated castor oil acids are reacted.

10. The reaction product of
    (1) complex mixed mono-, di- and polycarboxylic acids derived from phenol extracts obtained in the phenol extraction of mineral lubricating oils by reaction of said phenol extracts with sodium to form the sodium adduct, carbonation of said sodium adduct to form the sodium salt of the corresponding carboxylic acid and acidification of said salt to form the free acids, said acids being characterized by having an acid number of about 200 to 280, contain about 1.7 to 2.3% by weight of combined sulfur and having an average molecular weight of about 325 to 450,
    (2) a stoichiometric deficiency of ethylene glycol at a temperature of about 270° F. to form a linear polyester, followed by reaction of said linear polyester with
    (3) a stoichiometric excess of glycerine in the presence of
    (4) dehydrated castor oil acids at a temperature of about 450° F.

11. The reaction product in accordance with claim 10 in which about 150 parts of complex carboxylic acids, about 17 parts of ethylene glycol, about 32 parts of glycerine and about 200 parts of dehydrated castor oil acids are reacted.

12. The reaction product of
    (1) about 150 parts of complex mixed mono-, di- and polycarboxylic acids derived from phenol extracts obtained in the phenol extraction of mineral lubricating oils by reaction of said phenol extracts with sodium to form the sodium adduct, carbonation of said sodium adduct to form the sodium salt of the corresponding carboxylic acid and acidification of said salt to form the free acids, said acids being characterized by having an acid number of about 200 to 280, contain about 1.7 to 2.3% by weight of combined sulfur and having an average molecular weight of about 325 to 450,
    (2) about 30 parts of pinacol at a temperature of about 302° F. to form a linear polyester, followed by reaction of said linear polyester with (3) about 32 parts of glycerine and
(4) about 200 parts of dehydrated castor oil acids at a temperature of about 450° F.

References Cited by the Examiner

UNITED STATES PATENTS

| | | | |
|---|---|---|---|
| 2,577,770 | 12/1951 | Kass et al. | 260—22 |
| 2,585,323 | 2/1952 | Elwell et al. | 260—22 |
| 2,970,164 | 1/1961 | Jezl | 260—75 |
| 3,057,824 | 10/1962 | Le Bras et al. | 260—22 |
| 3,129,192 | 4/1964 | Krammer et al. | 260—75 |

OTHER REFERENCES

Conant et al., J.A.C.S., vol. 50, 1928, pp. 542–44.

Lawrence, Polyester Resins, Reinhold Plastics Applications Series, New York, 1960, p. 86.

LEON J. BERCOVITZ, *Primary Examiner.*

M. STERMAN, *Examiner.*